US011916315B2

(12) United States Patent
Underwood et al.

(10) Patent No.: US 11,916,315 B2
(45) Date of Patent: Feb. 27, 2024

(54) CIRCULAR DISK WITH FIRST AND SECOND EDGE OPENINGS

(71) Applicant: The Government of the United States, as represented by the Secretary of the Army, Washington, DC (US)

(72) Inventors: Brandon Underwood, Brick Township, NJ (US); Glenn Minko, Staten Island, NY (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 17/522,950

(22) Filed: Nov. 10, 2021

(65) Prior Publication Data

US 2023/0141422 A1 May 11, 2023

(51) Int. Cl.
*H01Q 5/40* (2015.01)
*H01Q 9/04* (2006.01)

(52) U.S. Cl.
CPC ............... *H01Q 9/045* (2013.01); *H01Q 5/40* (2015.01)

(58) Field of Classification Search
CPC ................................ H01Q 9/045; H01Q 5/40
See application file for complete search history.

(56) References Cited

U.S. PATENT DOCUMENTS

| | | | | |
|---|---|---|---|---|
| 6,690,331 | B2 * | 2/2004 | Apotolos | H01Q 11/14 343/741 |
| 7,084,815 | B2 * | 8/2006 | Phillips | H01Q 5/40 343/846 |
| 8,648,768 | B2 * | 2/2014 | Mussler | H01Q 9/0407 343/753 |
| 11,183,763 | B2 * | 11/2021 | Du | H01Q 11/08 |
| 11,233,337 | B2 * | 1/2022 | Ryoo | H01Q 9/0407 |
| 11,437,723 | B2 * | 9/2022 | Park | H01Q 1/241 |
| 11,502,414 | B2 * | 11/2022 | Parsche | H01Q 21/28 |
| 2009/0102723 | A1 * | 4/2009 | Mateychuk | H01Q 5/40 343/700 MS |
| 2010/0207830 | A1 * | 8/2010 | Parsche | H01Q 9/0435 343/731 |
| 2015/0229026 | A1 * | 8/2015 | Lindmark | H01Q 21/24 343/770 |
| 2020/0366001 | A1 * | 11/2020 | Popugaev | H01P 5/227 |
| 2021/0203074 | A1 * | 7/2021 | Du | H01Q 11/08 |
| 2022/0045442 | A1 * | 2/2022 | Fabrega Sanchez | H01Q 5/42 |
| 2022/0247082 | A1 * | 8/2022 | Parsche | H01Q 5/40 |

FOREIGN PATENT DOCUMENTS

| | | | |
|---|---|---|---|
| CN | 210806003 U | * | 6/2020 |
| CN | 113346238 A | * | 9/2021 |

* cited by examiner

*Primary Examiner* — Dameon E Levi
*Assistant Examiner* — Anh N Ho
(74) *Attorney, Agent, or Firm* — Ronald Krosky

(57) ABSTRACT

Various embodiments that relate to a circular disk configured to radiate a signal. The radiating disk can include edge openings. Within these edge openings power supplies can rest. When the power supplies function, they can cause the circular disk to radiate with either a dipole pattern or a cardioid pattern. A controller can manage how these power supplies function depending on if the dipole pattern or the cardioid pattern is desired.

7 Claims, 27 Drawing Sheets

300A

300B

400A

400B

400C

400D

600A

600B

700A $$\mathbf{E}^{S}(\mathbf{r}) = -jk_0\eta_0 \frac{e^{-jkr}}{4\pi r}\int_{S} \mathbf{J}(\mathbf{r}')e^{jk\mathrm{r}'*\hat{\mathrm{r}}}d\mathbf{S}'$$

Where

| | |
|---|---|
| $\hat{r}$ | Unit Vector of **r** |
| $k_0 = \sqrt{\mu_0\varepsilon_0}$ | Wave Number |
| $\eta_0 = \sqrt{\mu_0/\varepsilon_0}$ | Wave Impedance |

FIG. 7A

700C $$\mathbf{J} = \sum_{n} a_n \mathbf{J}_n$$

FIG. 7C

700D $$XJ_n = \lambda_n R J_n$$

Where

| | |
|---|---|
| $J_n$ | Induced Current Mode |
| $\lambda_n$ | Related Eigenvalue |

FIG. 7D

700E $$\mathrm{MS} = \frac{1}{1 + j\lambda_n}$$

FIG. 7E

700E $$\alpha_n \in 90^{o},270^{0}$$

$$\alpha_n=180^{o}-tan^{-1}(\lambda_n)$$

- Exists between 90 and 270 degrees
- Modes with $\alpha_n$ at or near 180 degrees are effective radiators
- Modes with $\alpha_n$ at or near 90° or 270° degrees are ineffective radiators

FIG. 7F

700G $$R^*J,J^* = 1$$

CM Analysis based on Units of Radiation
(J and J* are Hermitian/Reversible)

$$\langle \mathbf{J}_m, \mathbf{R} * \mathbf{J}_n \rangle = \langle \mathbf{J}_m^*, \mathbf{R} * \mathbf{J}_n \rangle = \delta_{mn}$$

Orthogonality relationship defining where an isolated current pattern exists

Where, $$\delta_{mn} = \begin{cases} 1, & m = n \\ 0, & m \neq n \end{cases}$$

$$\langle \mathbf{J}_m, \mathbf{R} * \mathbf{J}_n \rangle = \langle \mathbf{J}_m^*, \mathbf{R} * \mathbf{J}_n \rangle = \lambda_n \delta_{mn}$$

Orthogonality Definition Related to Eigenvalue

FIG. 7G

700H

Impressed field $\mathbf{E}^i$ excites the nth CM With strength $$V_n = \iint_S \mathbf{J}_n * \mathbf{E}^i ds$$

FIG. 7H

CIRCULAR DISK WITH FIRST AND SECOND EDGE OPENINGS

GOVERNMENT INTEREST

The innovation described herein may be manufactured, used, imported, sold, and licensed by or for the Government of the United States of America without the payment of any royalty thereon or therefor.

BACKGROUND

In a variety of situations, communications can be an important capability. In one example, a group, such as a military force, can decide to set up in a remote location; this remote location can be absent a modern communications infrastructure. Therefore, to achieve communication capabilities, equipment can be brought in from another location. The equipment can be employed at the remote location by this group for use in communications.

SUMMARY

In one embodiment, a circular disk can be capable of radiation. The circular disk can comprise a first edge opening configured to receive a first voltage source. The circular disk can also comprise a second edge opening configured to receive a second voltage source. The first edge opening and the second edge opening can be along a common axis.

In one embodiment, a method can be performed at least in part by a power system controller that is at least partially hardware. The method can comprise powering a first voltage source in a first edge opening of a circular disk to cause radiation. The method can also comprise powering a second voltage source in a second edge opening of the circular disk to cause radiation. The first edge opening and the second edge opening can be along a common axis.

In one embodiment, a power system, at least partially for a circular disk configured to radiate a signal, can comprise a first voltage source located in a first edge opening of the circular disk. The power system can also comprise a second voltage source located in a second edge opening of the circular disk. The first edge opening and the second edge opening can be along a common axis.

BRIEF DESCRIPTION OF THE DRAWINGS

Incorporated herein are drawings that constitute a part of the specification and illustrate embodiments of the detailed description. The detailed description will now be described further with reference to the accompanying drawings as follows:

FIG. 7A illustrates one embodiment of an equation set for an Electrical Field Integral Equation;

FIG. 7C illustrates one embodiment of an equation set for current;

FIG. 7D illustrates one embodiment of an equation set for an Characteristic Mode related to R and X with regard to Impedance portions;

FIG. 7E illustrates one embodiment of an equation set for Modal Significance;

FIG. 7F illustrates one embodiment of an equation set for Characteristic Angle;

FIG. 7G illustrates one embodiment of an equation set for Characteristic Mode Orthogonality;

FIG. 7H illustrates one embodiment of an equation set for a rendered field;

Multiple figures can be collectively referred to as a single figure. For example, FIG. 3 illustrates two subfigures—FIG. 3A and FIG. 3B. These can be collectively referred to as 'FIG. 3.'

DETAILED DESCRIPTION

Figure 1A:
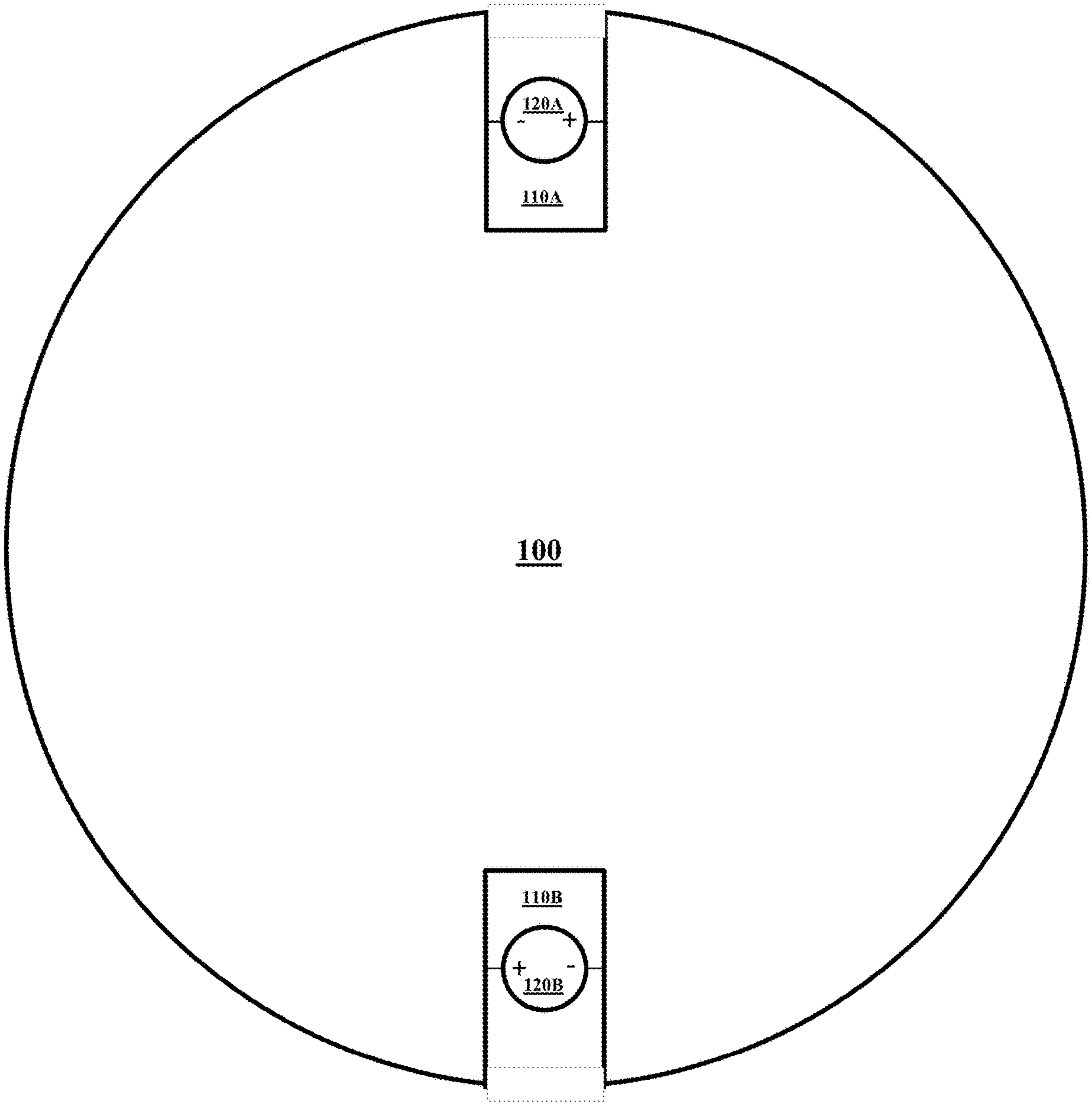
FIG. 1A illustrates one embodiment of a circular disk with a first edge opening and a second edge opening.

A circular disk configured to radiate a signal can have openings at its edge. These openings can receive power sources. When the power sources function, the disk can emit a radiation pattern, such as when flat on the horizontal plane, including when placed on a mast, on the ground, or on a vehicle. Depending on how the power sources function, the radiation pattern can be a dipole pattern or a cardioid pattern.

With a two source configuration, the openings can be across from one another. With a four source configuration, the sources can be 90 degrees from one another.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1A illustrates one embodiment of a circular disk 100 with a first edge opening 110A and a second edge opening 110B. The first edge opening 110A can be configured to receive a first voltage source 120A. The second edge opening 110B can be configured to receive a second voltage source 120B. The first edge opening 110A and the second edge opening 110B can be along a common axis and thus be across from one another.

There can be a desire to have antenna beam steering, so an antenna can be employed to achieve antenna beam steering. The circular disk 100 can be employed to achieve this beam steering through a cardioid pattern (enhance gain where focused and antenna pattern null where not focused). Further, the voltage sources 120A and 120B can have their own orientations—first orientation for 120A and second orientation for 120B. These orientations can be opposite one another, with the first source 120A having its positive on the right and second source 120B having its positive on the left.

Figure 1B:
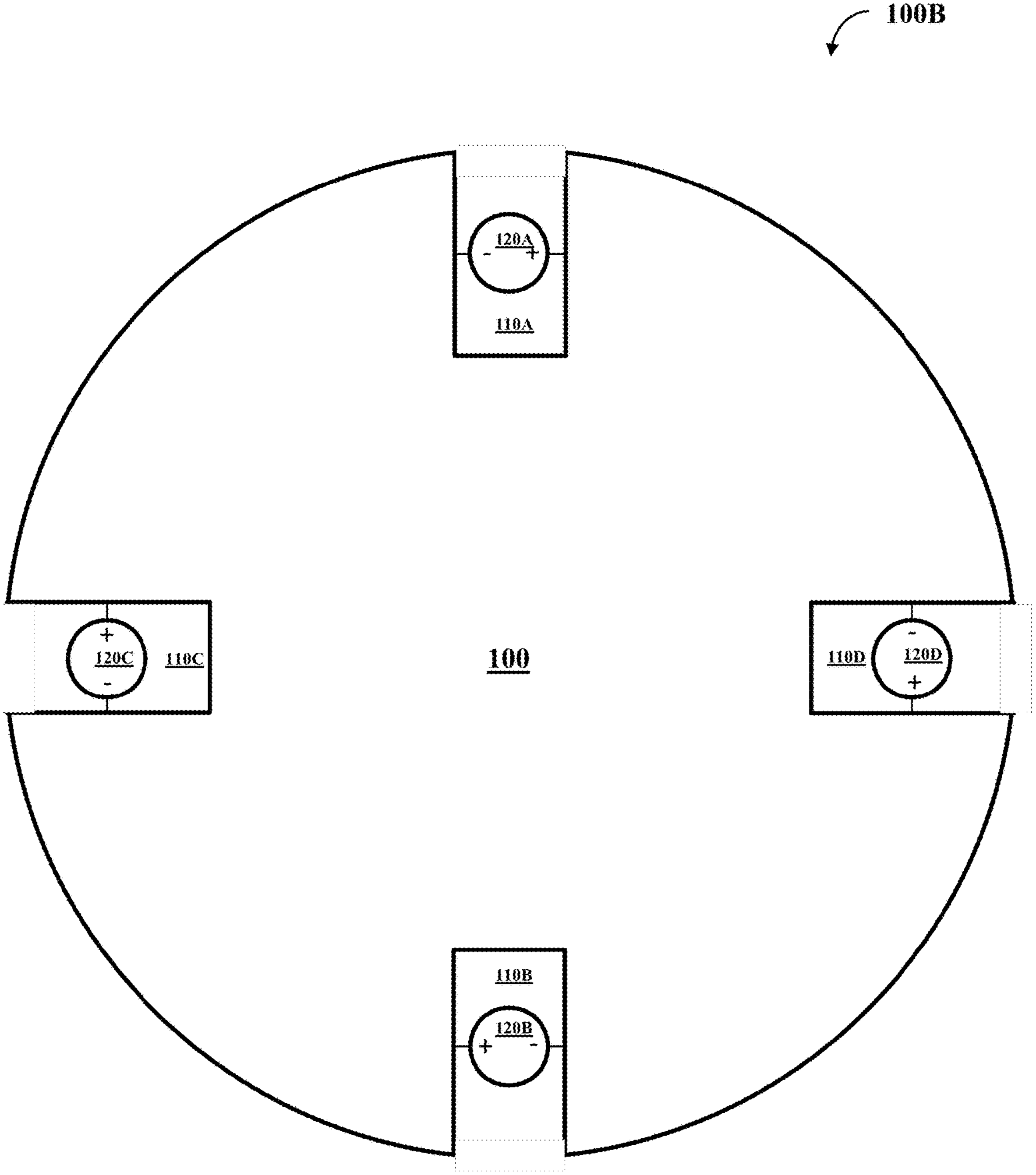
FIG. 1B illustrates one embodiment of the circular disk with the first edge opening and the second edge opening along with a third edge opening and a fourth edge opening.

FIG. 1B illustrates one embodiment of the circular disk 100 with the first edge opening 110A and the second edge opening 110B along with a third edge opening 110C and a fourth edge opening 110D. The third edge opening 110C can be configured to receive a third voltage source 120C and the fourth edge opening 110D can be configured to receive a fourth voltage source 120D. The third edge opening 110C and the fourth edge opening 110D can be along a second common axis, with the second edge opening 110B and the third edge opening 110C being about 90 degrees from one another.

Figure 1C:
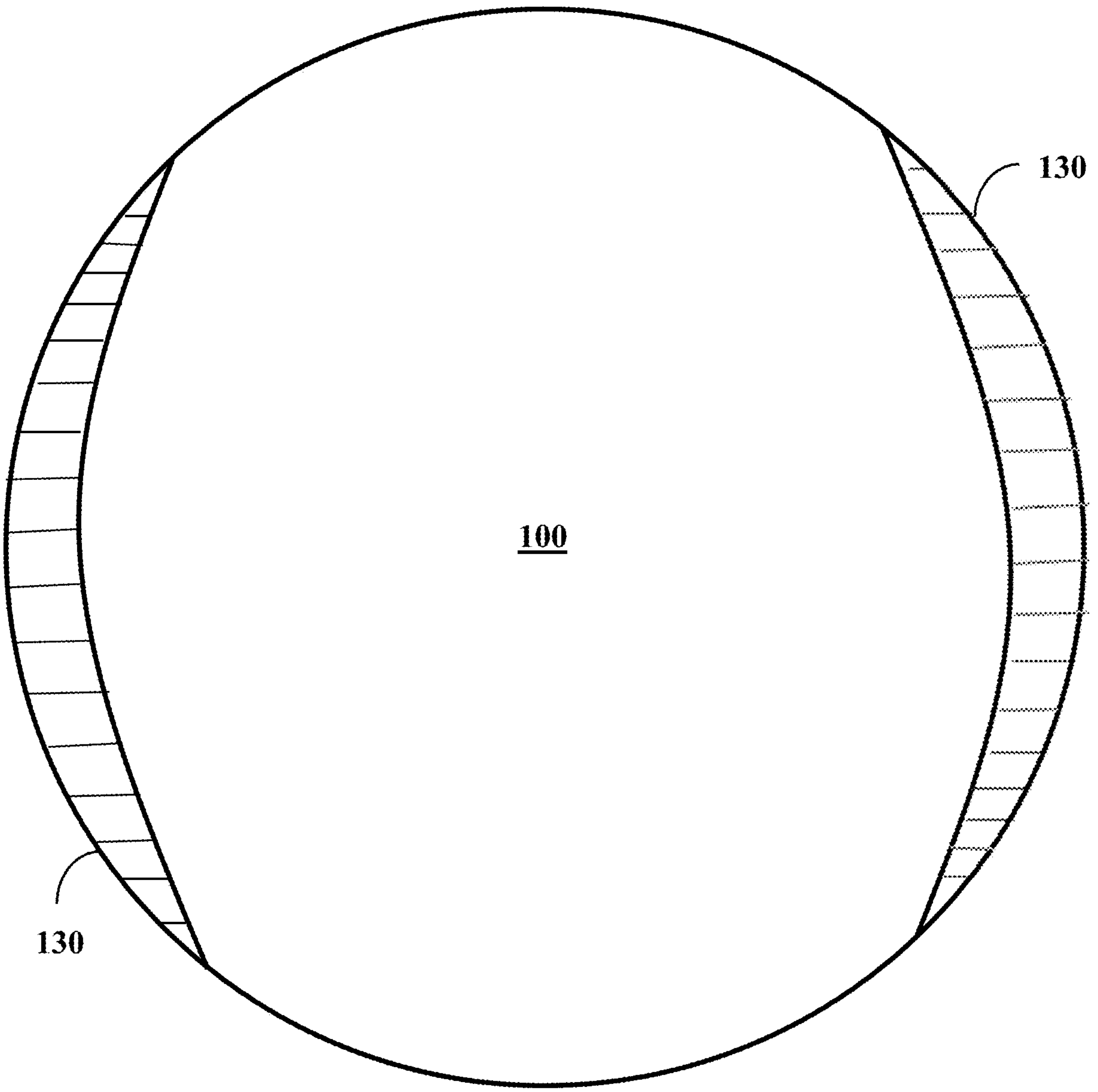
FIG. 1C illustrates one embodiment of the circular disk depicting current depth and concentration.

FIG. 1C illustrates one embodiment of the circular disk 100 depicting current depth and concentration 130. The current depth and concentration can illustrate current maximums. The size of the circular disk 100 can be a diameter that is one quarter the wavelength for anticipated operation. The circular disk 100 can radiate a signal at a frequency and pattern.

The disk 100 can function in different modes. The first mode can result in the concentration 130 with current maximums. A second mode can include voltage maximums at 90 degrees from the current maximums.

The areas of maximum current density/concentration can be determined by characteristic mode analysis (CMA), such as performed by an analysis component. A determination component can determine a feed position for the disk 100 and this determination can employ the CMA result.

Figure 2:
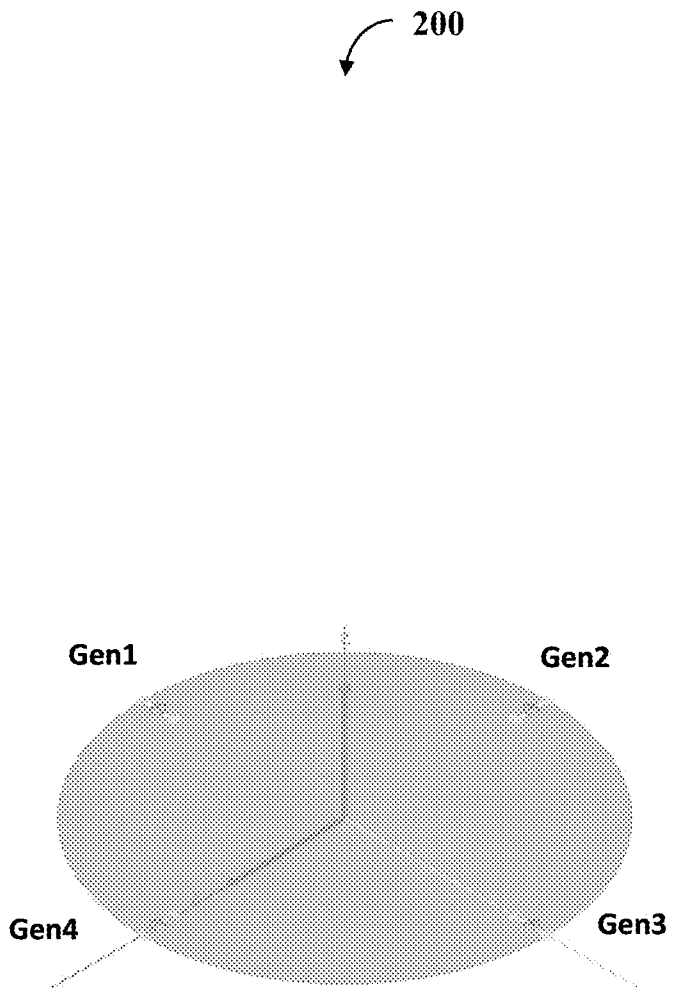
FIG. 2 illustrates one embodiment of a three dimensional configuration for the circular disk.

FIG. 2 illustrates one embodiment of a three dimensional configuration 200 for the circular disk 100 of FIG. 1. This shows four generators: Gen1-Gen4. These generators can function as the voltage sources 120A-D of FIG. 1: Gen1 being the first voltage source 120A, Gen2 being the third voltage source 120C, Gen3 being the second voltage source 120B, and Gen 4 being the fourth voltage source 120D. The configuration 200 can achieve 360 degree cardioid steering in 90 degree increments in view of specified feed configuration parameters. These parameters can be selected by a management component and implemented by a causation component. Equivalent gains can be observed in different steering states (e.g., 0, 90, 180, and 270 degree states).

Figure 3A:
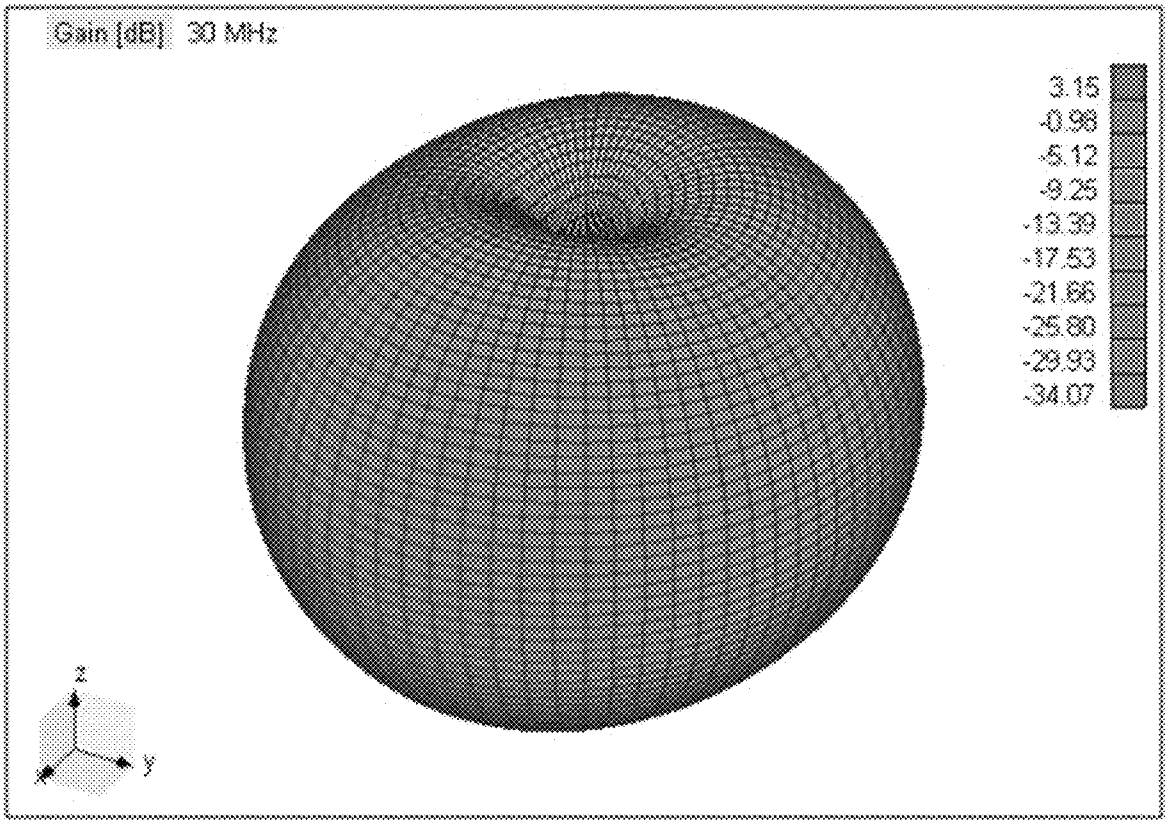
FIG. 3A illustrates one embodiment of a dipole mode pattern.
Figure 3B:
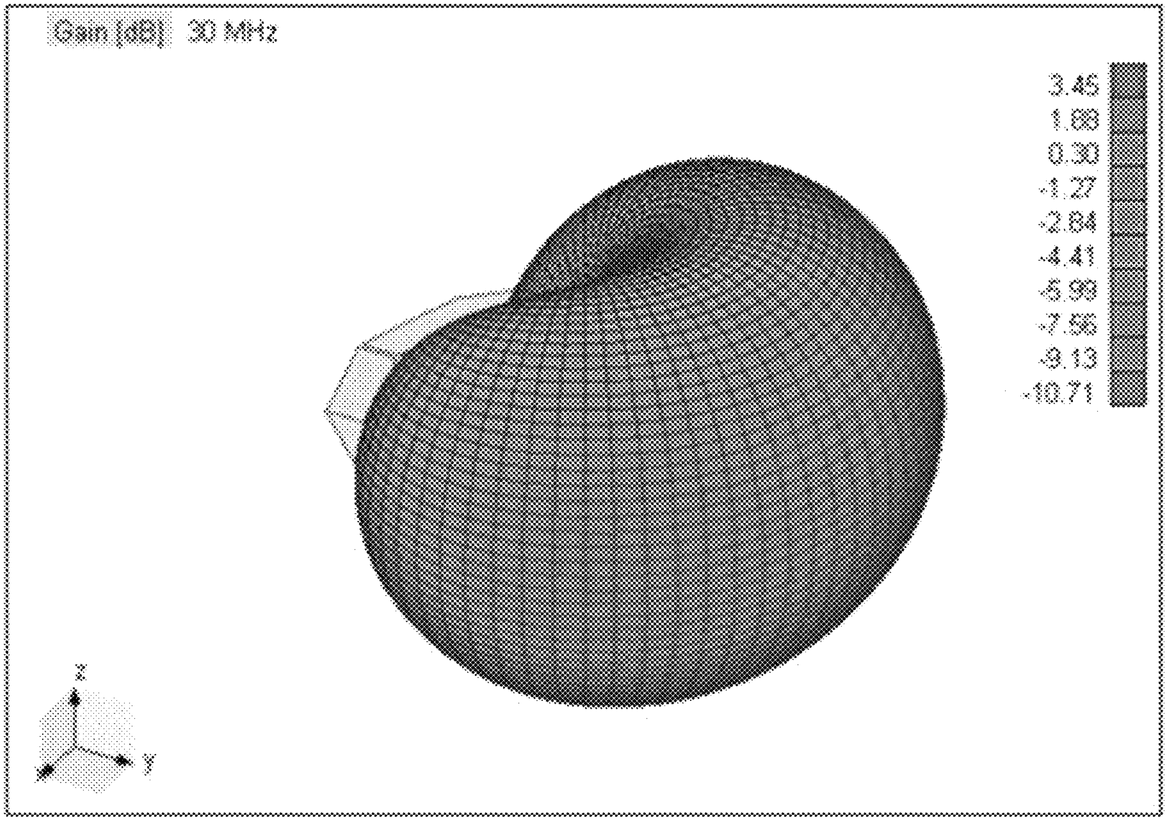
FIG. 3B illustrates one embodiment of a cardioid mode patter.
Figure 4A:
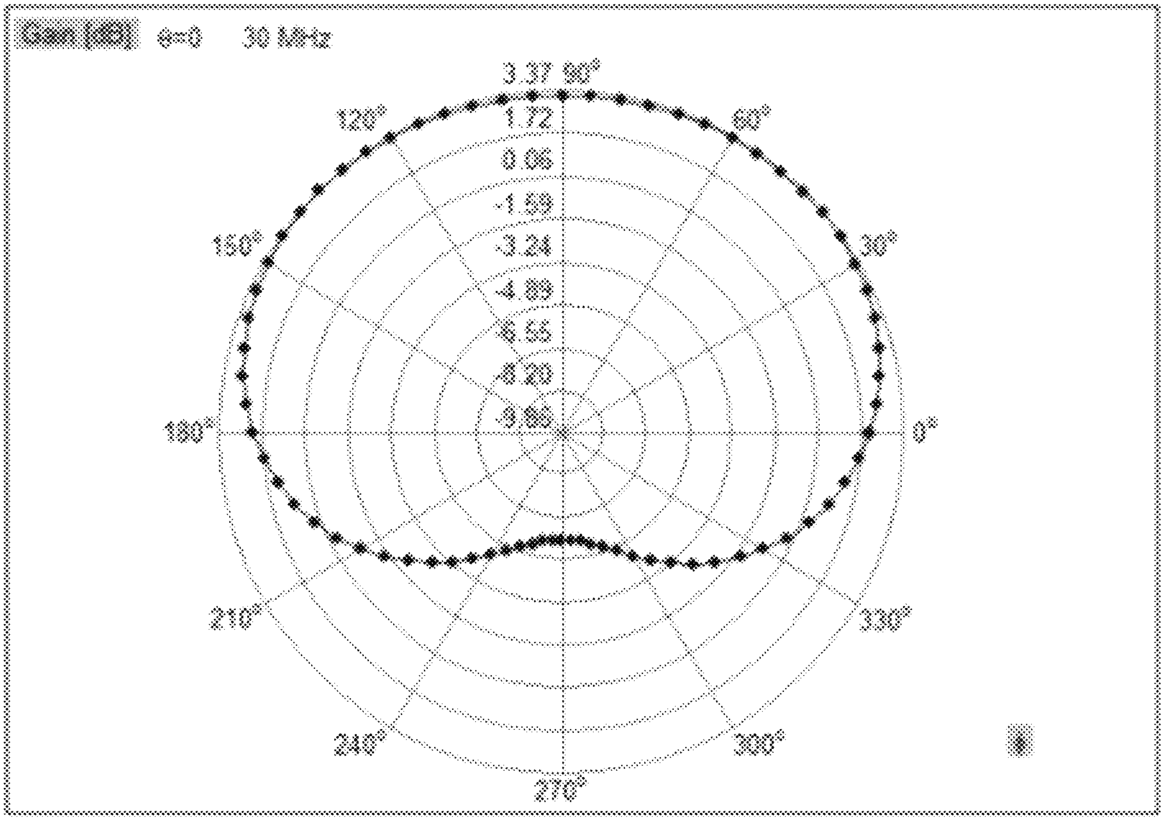
FIGS. 4A-4D illustrates one embodiment of the cardioid pattern in four states: a 0 state, a 90 state, a 180 state, and a 270 state.
Figure 4B:
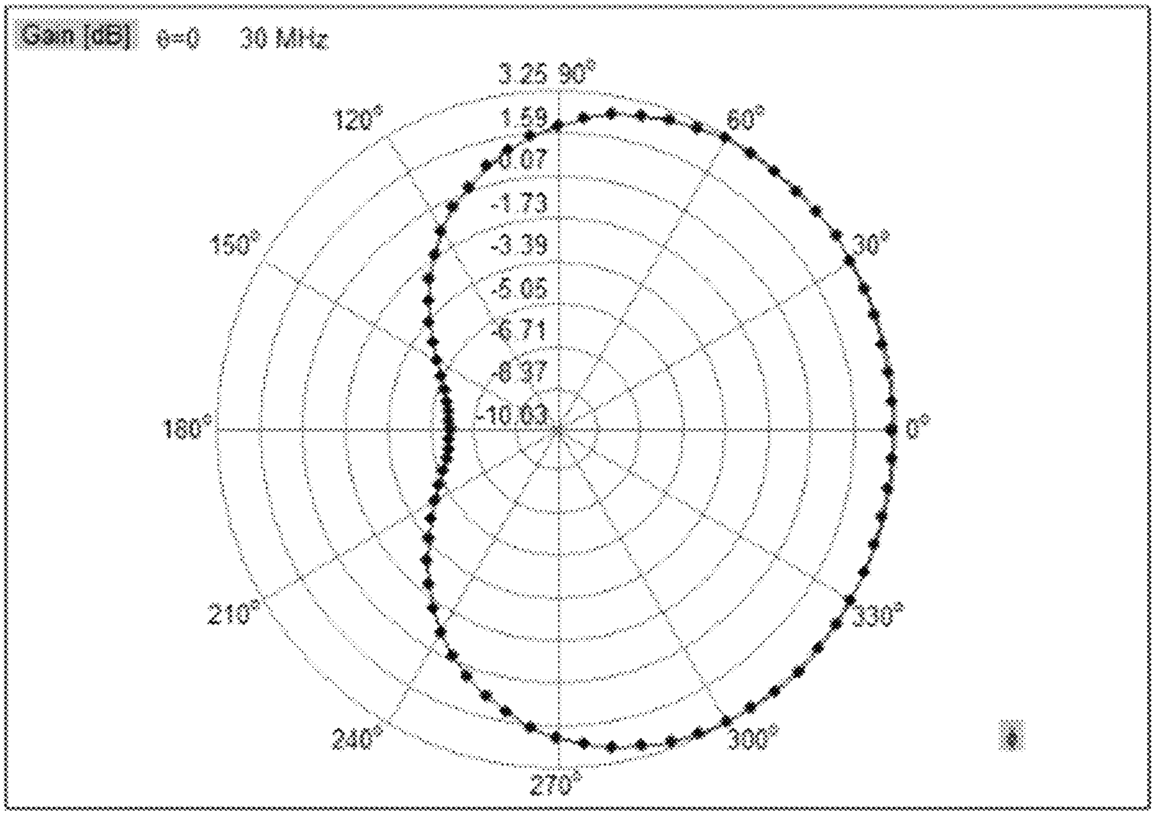
Figure 4C:
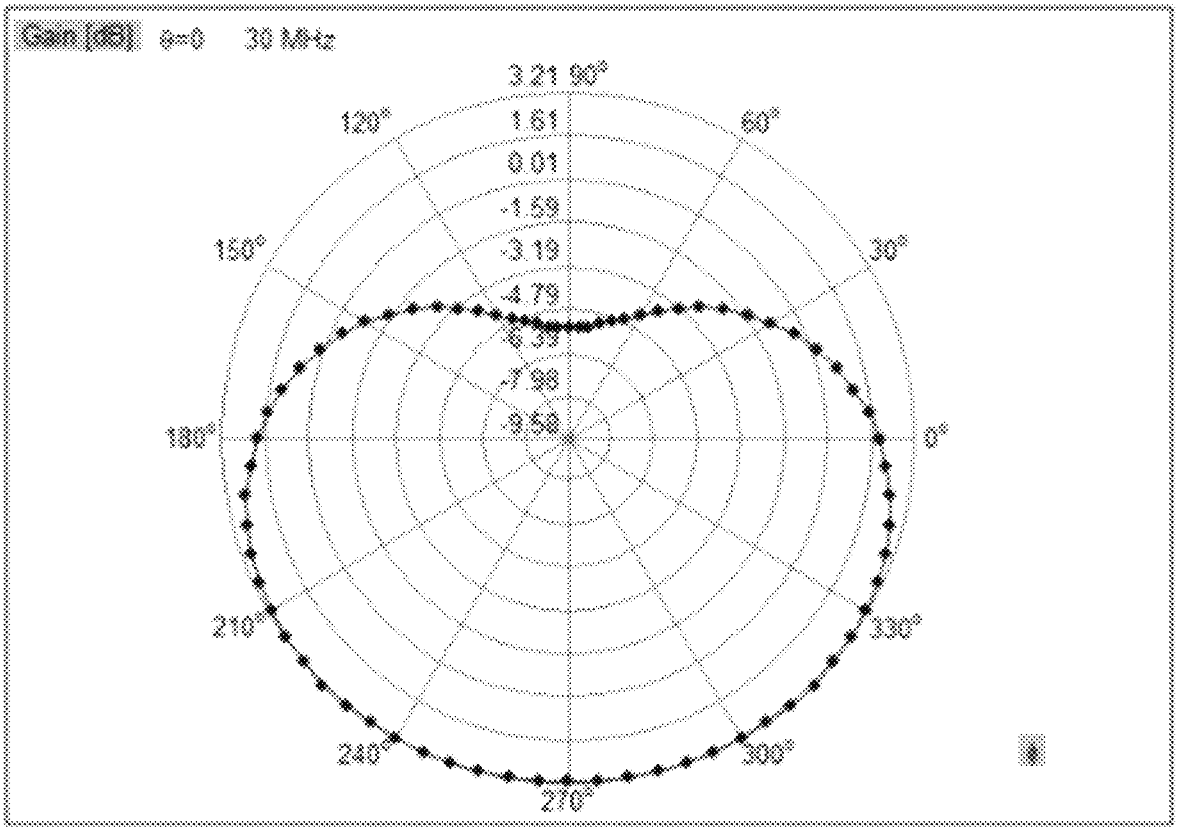
Figure 4D:
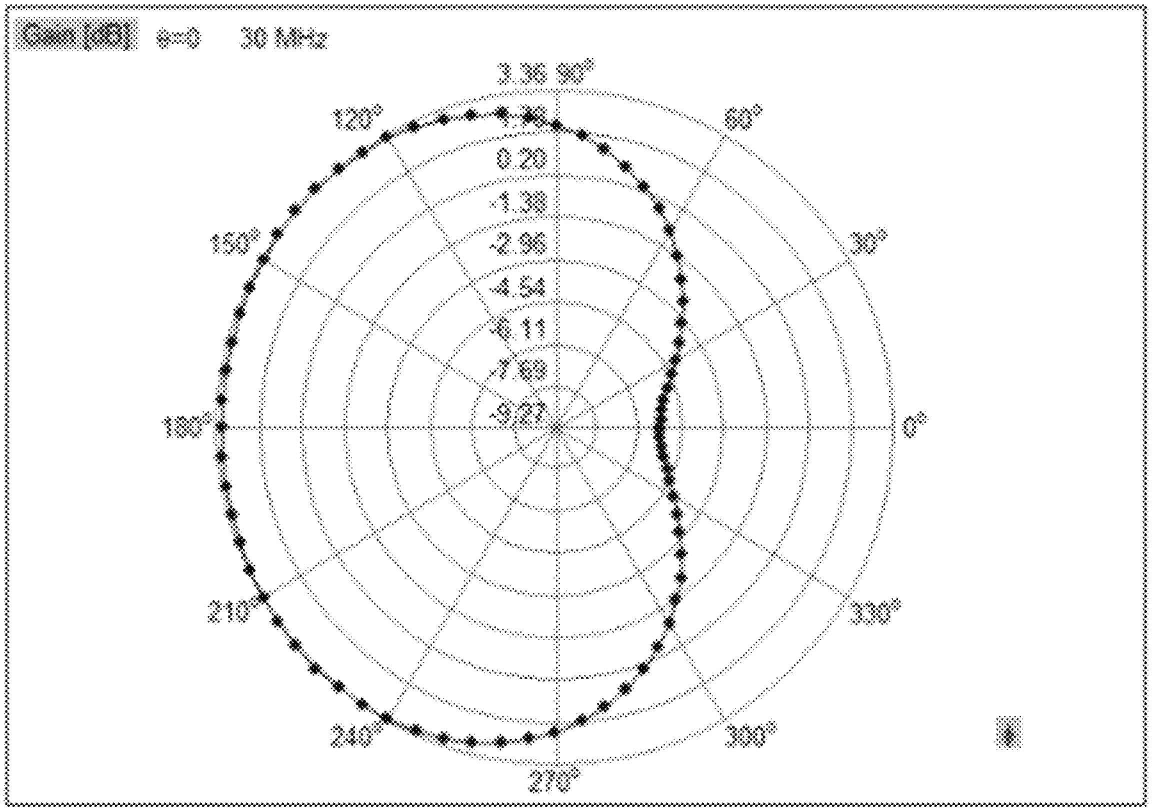

FIG. 3A illustrates one embodiment of a dipole mode pattern 300A and FIG. 3B illustrates one embodiment of a cardioid mode patter 300B. The disk 100 of FIG. 1 can have a diameter of about a quarter wavelength of a preferred frequency for a radiating pattern of the disk 100 of FIG. 1. In one example, the patterns 300A and 300B can function at 30 megahertz (MHz). With this, the diameter of the disk 100 of FIG. 1 can be 2.5 meters, with an opening length of 0.2 meters and an opening width of 0.03 meters.

FIGS. 4A-4D illustrates one embodiment of the cardioid pattern in four states: a 0 degree state at 400A, a 90 degree state at 400B, a 180 degree state at 400 C, and a 270 degree state at 400D. At the 0 degree state 400A (e.g., about 0 degree state), the first voltage source 120A of FIG. 1 can be at about 1 real and about 1 imaginary (1 real voltage unit and 1 imaginary voltage unit), the second voltage source 120B of FIG. 1 can be at about 1 real and about 0 imaginary, the third voltage source 120C of FIG. 1 can be shorted, and the fourth voltage source 120D of FIG. 1 can be shorted. At the 90 degree state (e.g., about 90 degree state), the first voltage source 120A of FIG. 1 can be at shorted, the second voltage source 120B of FIG. 1 can be shorted, the third voltage source 120C of FIG. 1 can be at about 1 real and about 1 imaginary, and the fourth voltage source 120D of FIG. 1 can be at about 1 real and about 0 imaginary. At the 180 degree state (e.g., about 180 degree state), the first voltage source 120A of FIG. 1 can be at about 1 real and about 0 imaginary, the second voltage source 120B of FIG. 1 can be at about 1 real and about 1 imaginary, the third voltage source 120C of FIG. 1 can be shorted, and the fourth voltage source 120D of FIG. 1 can be shorted. At the 270 degree state (e.g., about 270 degree state), the first voltage source 120A of FIG. 1 can be shorted, the second voltage source 120B of FIG. 1 can be shorted, the third voltage source 120C of FIG. 1 can be at about 1 real and about 1 imaginary, and the fourth voltage source 120D of FIG. 1 can be at about 1 real and about 0 imaginary. The 0 degree state, the 90 degree state, the 180 degree state, and the 270 degree state can cause the circular disk 100 of FIG. 1 to radiate with the cardioid pattern of FIG. 4.

Figure 5A:
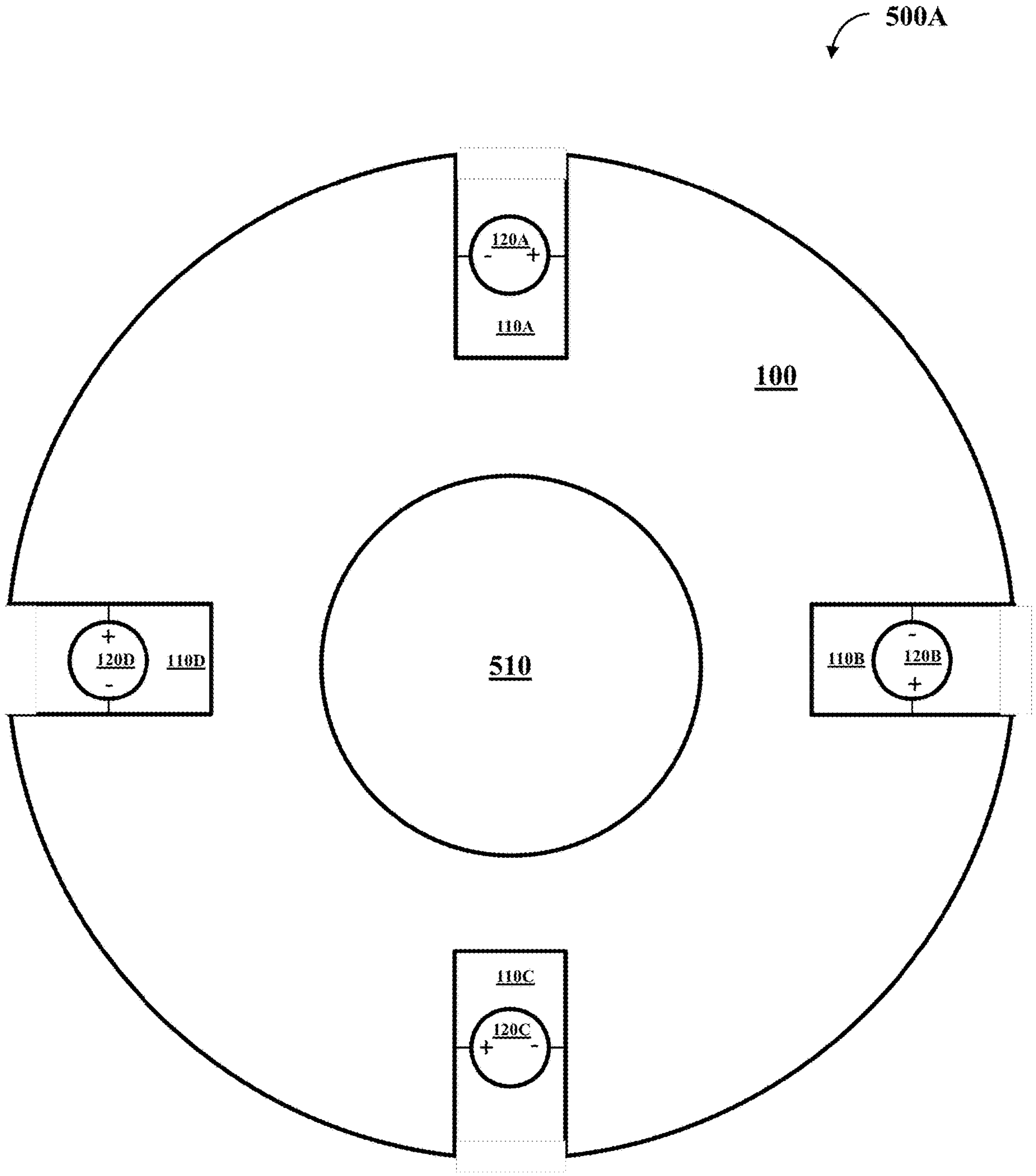
FIG. 5A illustrates one embodiment of a top-down view of the circular disk with a patch antenna.
Figure 5B:
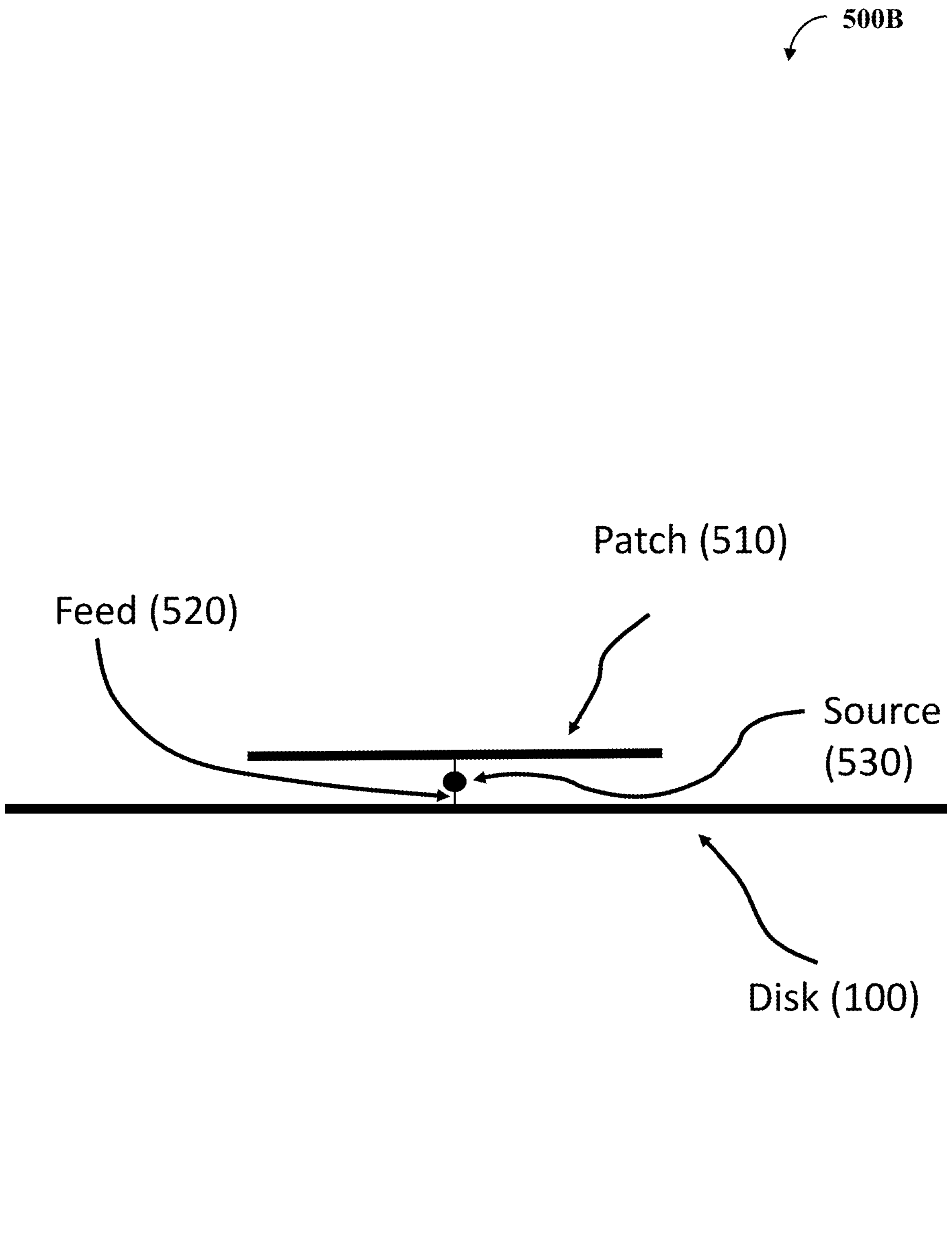
FIG. 5B illustrates one embodiment of a profile view of the circular disk with a patch antenna.

FIG. 5A illustrates one embodiment of a top-down view 500A of the circular disk 100 with a patch antenna 510 and FIG. 5B illustrates one embodiment of a profile view 500B of the circular disk 100 with a patch antenna 510. In one embodiment, the disk 100 can function in the very high frequency (VHF) band and the patch antenna 510 can function in the ultra high frequency (UHF) band. VHF 30 MHz to 300 MHz can be while UHF can be 300 MHz to 3 gigahertz (GHz).

A feed 520 can supply a source 530 that powers the patch 510. The feed 520 and the source 530 can function as an attachment point about centrally located upon the circular disk 100 configured to retain the patch 510. Further, the feed 520 can pass through the circular disk 100 causing the patch antenna 510 to be coupled to the circular disk 100 (even if the feed 520 does not actually touch the circular disk 100).

Figure 6A:
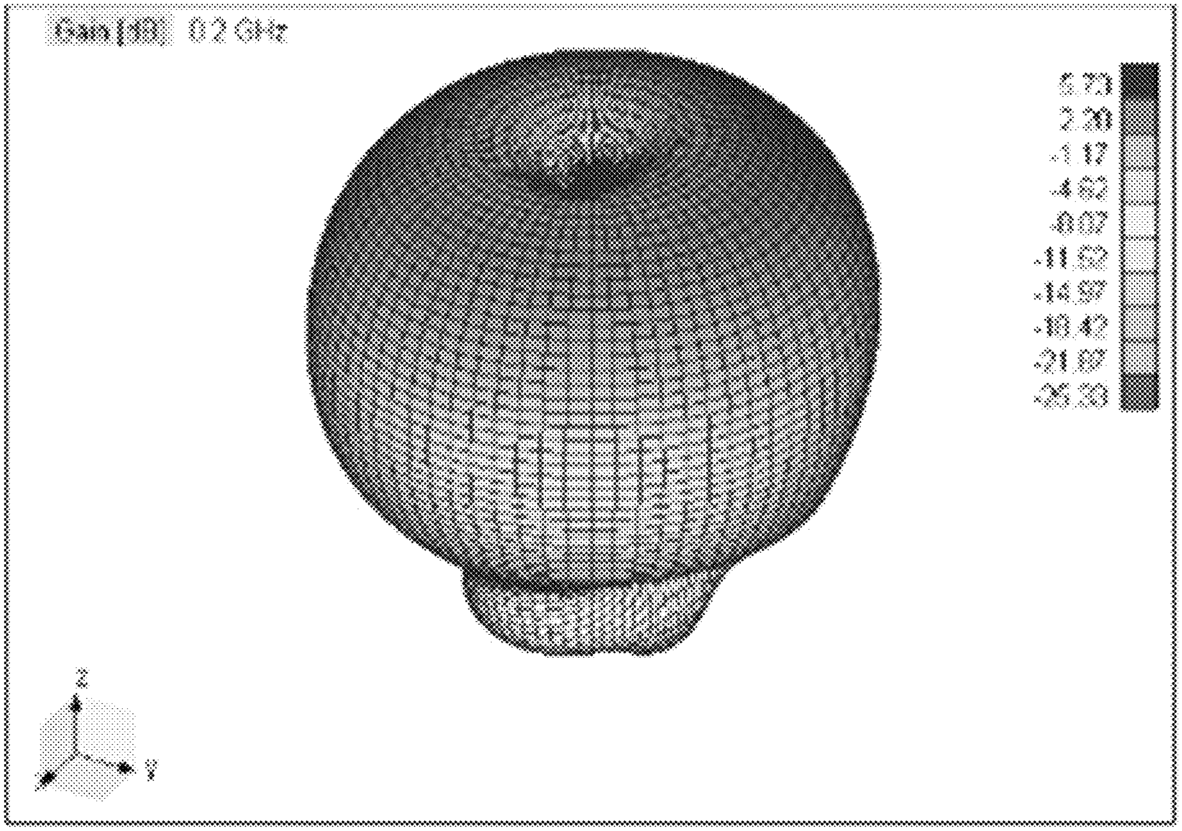
FIG. 6A illustrates one embodiment of a three dimensional radiation pattern for the patch antenna.
Figure 6B:
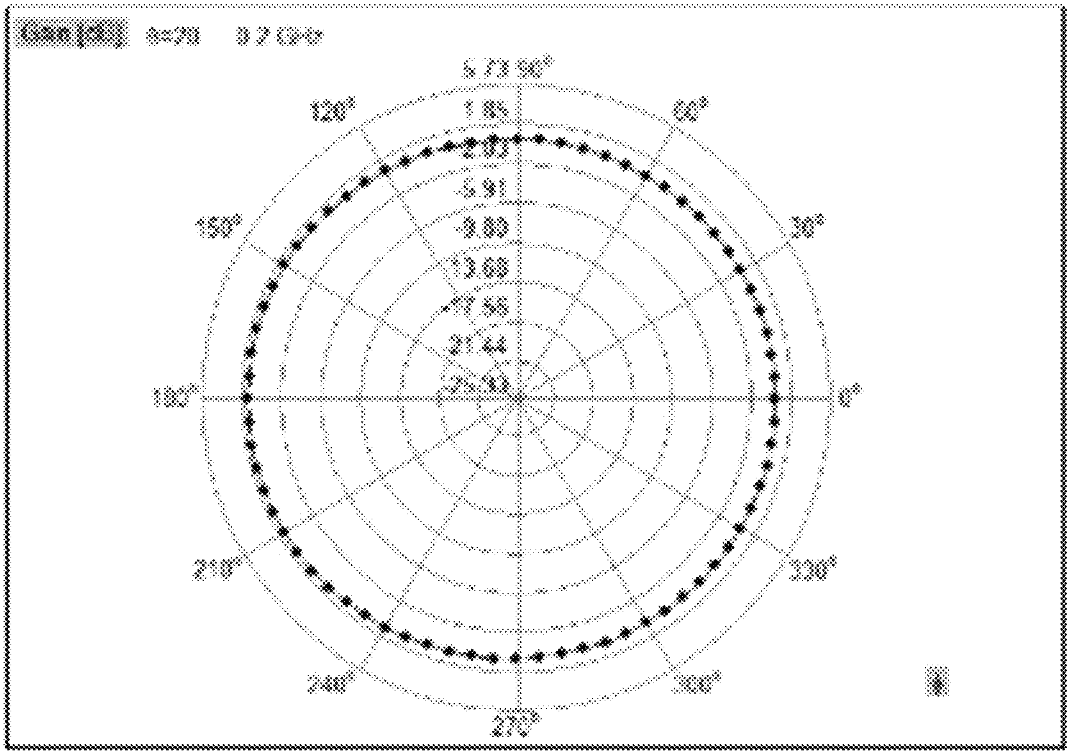
FIG. 6B illustrates one embodiment of an azimuth radiation pattern for the patch antenna.

FIG. 6A illustrates one embodiment of a three dimensional radiation pattern 600A for the patch antenna 510 of FIG. 5 and FIG. 6B illustrates one embodiment of an azimuth radiation pattern 600B for the patch antenna 510 of FIG. 5. Radiation of the patch antenna 510 of FIG. 5 can occur simultaneously with the disk 100 of FIG. 5 due to mode orthogonality. In view of FIG. 1C, as one can see the concentration 130 is at the edge, so the patch 510 of FIG. 1 being placed in the center would not cause physical interference.

The patch 510 is able to be placed in the middle of the VHF disk without substantially interfering with disk performance because of the principal of mode orthogonality. Certain regions of a structure can support current resonances at certain frequencies, while other regions of the structure support resonances at other frequencies. In the case of the disk 100, the disk 100 supports current resonance in low VHF at its outer edges, as can be seen with FIG. 1C. The center portion of the disk 100 is not involved in the VHF radiation process.

FIG. 7A illustrates one embodiment of an equation set 700A for an Electrical Field Integral Equation (EFIE). The equation set 700A can explain the electromagnetic (EM) principals for radiation from a current travelling in or over a structure, such as the disk 100 of FIG. 1.

Figure 7B:
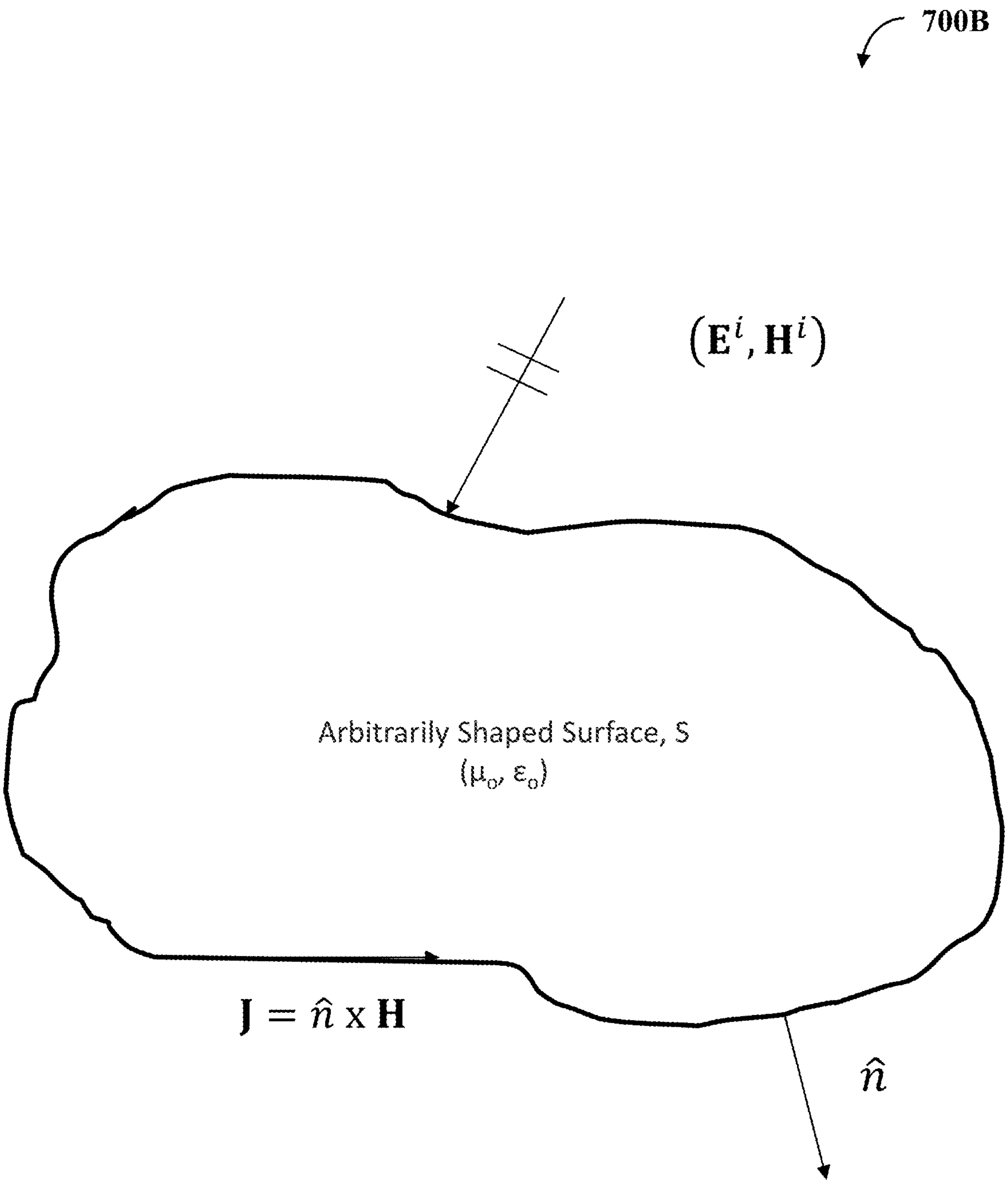
FIG. 7B illustrates one embodiment a current and electromagnetic field interaction with a surface.

FIG. 7B illustrates one embodiment a current and EM field interaction with a surface 700B. Characteristic Modes (CM) can be described, in one embodiment, by an EM field and current interacting within/about a structure, where the field and current are arranged in a substantially diagonalized fashion according to the principals of Linear Algebra, as permitted by the structure's geometry and applicable boundary conditions of the collective system of the structure and environment it is disposed within.

CMs and their analysis can refer to identification and specification of some level or degree to which a structure can support electromagnetic resonance, and how the currents/fields are arranged within/about the structure in instances where the resonance is supported. CMs can be a property of a structure and can be independent of voltage and/or current source (feed) magnitude(s) or location(s). In a form of CMA, currents can be considered as being discretized, wherein Induced currents are the superposition of characteristic currents.

Figure 8:
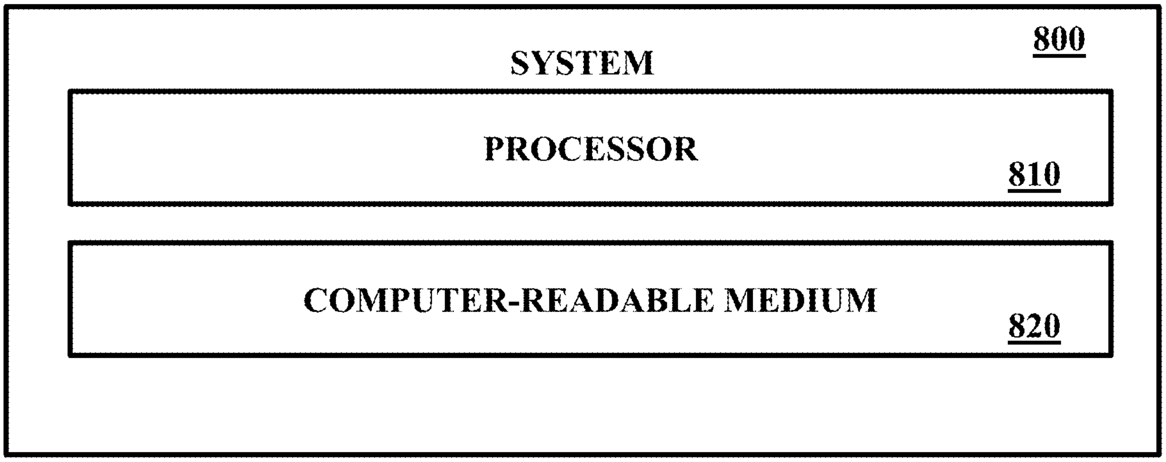
FIG. 8 illustrates one embodiment of a system comprising a processor and a computer-readable medium.

FIG. 7C illustrates one embodiment of an equation set 700C for current in accordance with CMA. FIG. 7D illustrates one embodiment of an equation set 700D for an Characteristic Mode related to R and X with regard to Impedance (Z) portions. FIG. 7E illustrates one embodiment of an equation set 700E for Modal Significance (MS). FIG. 7F illustrates one embodiment of an equation set 700F for Characteristic Angle ($\alpha_n$). FIG. 7G illustrates one embodiment of an equation set 700G for Characteristic Mode Orthogonality. FIG. 7H illustrates one embodiment of an equation set 700H for a rendered field. Equation set 700H can employ Maxwell's equation (Amp's law) in that the rendered field can be the highest when surface density J is at its maximum. Maximum excitation can be facilitated when an inductive source coupler (probe) is placed at or near location of maximum $J_n$. Conversely, a capacitive probe can be placed at or near where $J_n$ is minimum to excite the associated mode FIG. 8 illustrates one embodiment of a system 800 comprising a processor 810 and a computer-readable medium 820 (e.g., non-transitory computer-readable medium). In one embodiment, the system 800 is a power system controller, with instructions retained on the medium 820 and executed by the processor 810. In one embodiment, the computer-readable medium 820 is communicatively coupled to the processor 810 and stores a command set executable by the processor 810 to facilitate operation of at least one component disclosed herein (e.g., the analysis component and determination component discussed above). In one embodiment, at least one component disclosed herein (e.g., a component configured to calculate the at least some of the equations found in FIG. 7 discussed above) can be implemented, at least in part, by way of non-software, such as implemented as hardware by way of the system 800. In one embodiment, the computer-readable medium 820 is configured to store processor-executable instructions that when executed by the processor 810, cause the processor 810 to perform at least part of a method disclosed herein (e.g., at least part of one of the methods 900-1200 discussed below).

Figure 9:
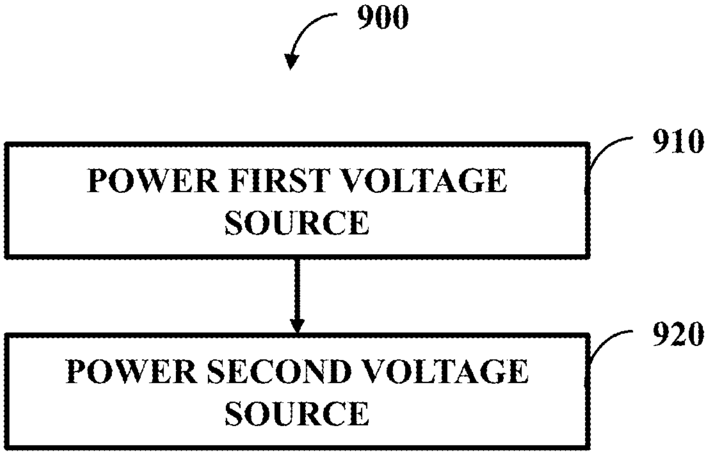
FIG. 9 illustrates one embodiment of a method comprising two actions.

FIG. 9 illustrates one embodiment of a method 900 comprising two actions 910-920. At 910, there can be powering the first voltage source 120A of FIG. 1 in the first edge opening 110A of FIG. 1 of the circular disk 100 of FIG. 1 to cause radiation. At 920, there can be powering the second voltage source 120B of FIG. 1 in the second edge opening 110B of FIG. 1 of the circular disk 100 of FIG. 1 to cause radiation. The first edge opening 110A of FIG. 1 and the second edge opening 110B of FIG. 1 can be along a common axis.

Figure 10:
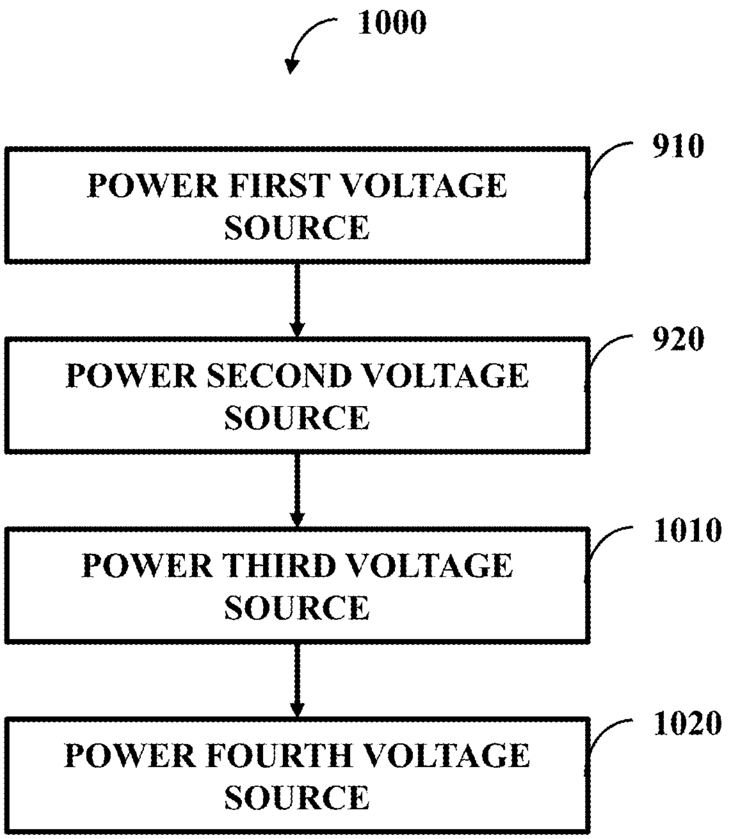
FIG. 10 illustrates one embodiment of a method comprising four actions.

FIG. 10 illustrates one embodiment of a method 1000 comprising four actions 910-920 and 1010-1020. At 1010, there can be powering the third voltage source 120C of FIG. 1 in the third edge opening 110C of FIG. 1 of the circular disk 100 of FIG. 1 to cause radiation. At 1020, there can be powering the fourth voltage source 120D of FIG. 1 in the fourth edge opening 110D of FIG. 1 of the circular disk 100 of FIG. 1 to cause radiation. The third edge opening 110C of FIG. 1 and the fourth edge opening 110D of FIG. 1 are can be along a common axis; also, the second edge opening 110B of FIG. 1 and the third edge opening 110C of FIG. 1 can be about perpendicular to one another.

Figure 11:
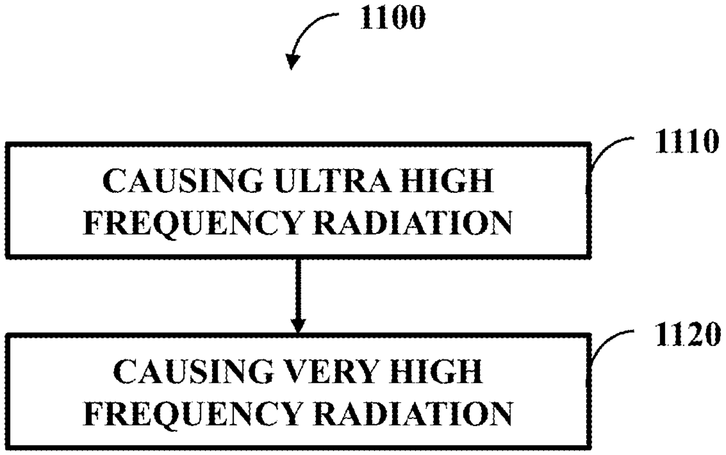
FIG. 11 illustrates one embodiment of a method comprising two actions.

FIG. 11 illustrates one embodiment of a method 1100 comprising two actions 1110-1120. At 1110, an UHF radiation can be caused, such as by powering the patch antenna 510 of FIG. 5 that is coupled to the circular disk 100 of FIG. 1 so the patch antenna 510 of FIG. 5 UHF. While this occurs, the disk 100 of FIG. 1 can radiate at VHF.

Figure 12:
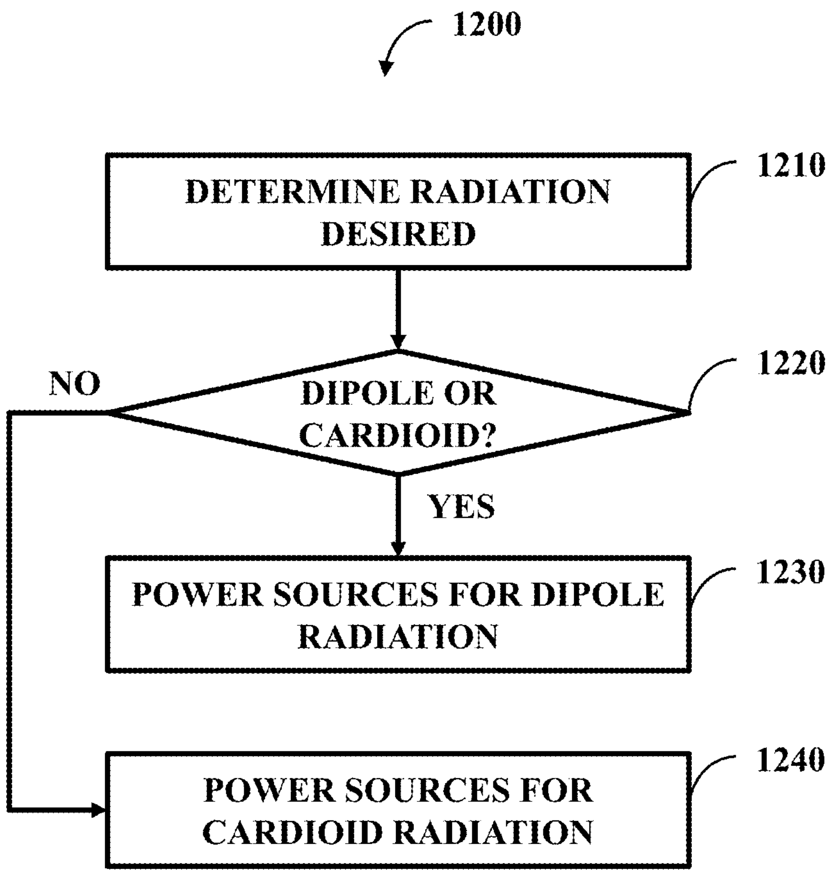
FIG. 12 illustrates one embodiment of a method comprising four actions.

FIG. 12 illustrates one embodiment of a method 1200 comprising four actions 1210-1220. At 1210, a determination can be made on if desired radiation is dipole or cardioid.

At 1220 a check can take place. If the check at 1220 results in dipole, then the method 1200 can power the sources in accordance with dipole radiation at 1230; if the check at 1220 results in cardioid, then the method 1200 can power sources in accordance with cardioid radiation at 1240.

The check 1220 can function as making an identification on if the circular disk 100 of FIG. 1 should radiate in a dipole pattern or a cardioid pattern. If the result is dipole, then at 1230 powering the first voltage source 120A of FIG. 1 and powering the second voltage source 120B of FIG. 1 can occur in a manner consistent with causing the dipole pattern. If the result if cardioid, then at 1240 powering the first voltage source 120A of FIG. 1 and powering the second voltage source 120B of FIG. 1 can occur in a manner consistent with causing the cardioid pattern.

In one embodiment, to achieve a dipole radiation pattern, the first voltage source 120A of FIG. 1 can be powered at 1 real and 0 imaginary. Also, the second voltage source 120B of FIG. 1 can be powered at 1 real and 0 imaginary.

In one embodiment, to achieve a cardioid radiation pattern, the first voltage source 120A of FIG. 1 can be is powered at 1 real and 1 imaginary. The second voltage source 120B of FIG. 1 can be powered at 1 real and 0 imaginary In one embodiment, to achieve a cardioid radiation pattern, at the 0 degree state the first voltage source 120A of FIG. 1 can be powered with a magnitude of about √2 and a phase of about 45°, the second voltage source 120B of FIG. 1 can be powered with a magnitude of about 1 and a phase of about 0°, the third voltage source 120C of FIG. 1 can be shorted, and the fourth voltage source 120D of FIG. 1 can be shorted. At an about 90 degree state, the first voltage source 120A of FIG. 1 can be shorted, the second voltage source 120B of FIG. 1 can be shorted, the third voltage source 120C of FIG. 1 can be powered with a magnitude of about 1 and a phase of about 0°, and the fourth voltage source 120D of FIG. 1 can be powered with a magnitude of about √2 and a phase of about 45°. At an about 180 degree state, the first voltage source 120A of FIG. 1 can be powered with a magnitude of about 1 and a phase of about 0°, the second voltage source 120B of FIG. 1 can be powered with a magnitude of about √2 and a phase of about 45°, the third voltage source 120C of FIG. 1 can be shorted, and the fourth voltage source 120D of FIG. 1 can be shorted. At an about 270 degree state, the first voltage source 120A of FIG. 1 can be shorted, the second voltage source 120B of FIG. 1 can be shorted, the third voltage source 120C of FIG. 1 can be powered with a magnitude of about √2 and a phase of about 45° and the fourth voltage source 120D of FIG. 1 can be powered with a magnitude of about 1 and a phase of about 0°.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A method performed at least in part by a power system controller that is at least partially hardware, the method comprising:

powering a first voltage source in a first edge opening of a circular disk to cause radiation;

powering a second voltage source in a second edge opening of the circular disk to cause radiation;

powering a third voltage source in a third edge opening of the circular disk to cause radiation; and powering a fourth voltage source in a fourth edge opening of the circular disk to cause radiation, where the first edge opening and the second edge opening are along a first common axis, where the third edge opening and the fourth edge opening are along a second common axis and where the second edge opening and the third edge opening are about perpendicular to one another where at an about 0 degree state, the first voltage source is powered with a magnitude of about √2 and a phase of about 45°, the second voltage source is powered with a magnitude of about 1 and a phase of about 0°, the third voltage source is shorted, and the fourth voltage source is shorted, where at an about 90 degree state, the first voltage source is shorted, the second voltage source is shorted, the third voltage source is powered with a magnitude of about 1 and a phase of about 0°, and the fourth voltage source is powered with a magnitude of about √2 and a phase of about 45°, where at an about 180 degree state, the first voltage source is powered with a magnitude of about 1 and a phase of about 0°, the second voltage source is powered with a magnitude of about √2 and a phase of about 45°, the third voltage source is shorted, and the fourth voltage source is shorted, where at an about 270 degree state, the first voltage source is shorted, the second voltage source is shorted, the third voltage source is powered with a magnitude of about √2 and a phase of about 45°, and the fourth voltage source is powered with a magnitude of about 1 and a phase of about 0°, and where the 0 degree state, the 90 degree state, the 180 degree state, and the 270 degree state cause the circular disk to radiate with a cardioid pattern.

2. A method performed at least in part by a power system controller that is at least partially hardware, the method comprising:

powering a first voltage source in a first edge opening of a circular disk to cause radiation; and powering a second voltage source in a second edge opening of the circular disk to cause radiation, where the first edge opening and the second edge opening are along a common axis, where the first voltage source is powered at 1 real voltage unit and 0 imaginary voltage unit, where the second voltage source is powered at 1 real voltage unit and 0 imaginary voltage unit, where powering the first voltage source at 1 real voltage unit and 0 imaginary voltage unit and powering the second voltage source at 1 real voltage unit and 0 imaginary voltage unit causes the circular disk to radiate in a dipole pattern.

3. A method performed at least in part by a power system controller that is at least partially hardware, the method comprising:

powering a first voltage source in a first edge opening of a circular disk to cause radiation; and powering a second voltage source in a second edge opening of the circular disk to cause radiation, where the first edge opening and the second edge opening are along a common axis, where the first voltage source is powered at 1 real voltage unit and 1 imaginary voltage unit, where the second voltage source is powered at 1 real voltage unit and 0 imaginary voltage unit, where powering the first voltage source at 1 real voltage unit and 1 imaginary voltage unit and powering the second voltage source at 1 real voltage unit and 0 imaginary voltage unit causes the circular disk to radiate in a cardioid pattern.

4. A method performed at least in part by a power system controller that is at least partially hardware, the method comprising:

powering a first voltage source in a first edge opening of a circular disk to cause radiation;

powering a second voltage source in a second edge opening of the circular disk to cause radiation; and making an identification on if the circular disk should radiate in a dipole pattern or a cardioid pattern, where the first edge opening and the second edge opening are along a common axis, where powering the first voltage source and powering the second voltage source occur in a manner consistent with causing the dipole pattern when the identification is that radiation should be in the dipole pattern and where powering the first voltage source and powering the second voltage source occur in a manner consistent with causing the cardioid pattern when the identification is that radiation should be in the cardioid pattern.

5. A power system, at least partially for a circular disk configured to radiate a signal, comprising:

a first voltage source located in a first edge opening of the circular disk;

a second voltage source located in a second edge opening of the circular disk, a third voltage source located in a third edge opening of the circular disk; and a fourth voltage source located in a fourth edge opening of the circular disk, where the first edge opening and the second edge opening are along a first common axis, where the third edge opening and the fourth edge opening are along a second common axis, where the second edge opening and the third edge opening are about 90 degrees from one another, where at an about 0 degree state, the first voltage source is at about 1 real voltage unit and about 1 imaginary voltage unit, the second voltage source is at about 1 real voltage unit and about 0 imaginary voltage unit, the third voltage source is shorted, and the fourth voltage source is shorted, where at an about 90 degree state, the first voltage source is shorted, the second voltage source is shorted, the third voltage source is at about 1 real voltage unit and about 0 imaginary voltage unit, and the fourth voltage source is at about 1 real voltage unit and about 1 imaginary voltage unit, where at an about 180 degree state, the first voltage source is at about 1 real voltage unit and about 0 imaginary voltage unit, the second voltage source is at about 1 real voltage unit and about 1 imaginary voltage unit, the third voltage source is shorted, and the fourth voltage source is shorted, where at an about 270 degree state, the first voltage source is shorted, the second voltage source is shorted, the third voltage source is at about 1 real voltage unit and about 1 imaginary voltage unit, and the fourth voltage source is at about 1 real voltage unit and about 0 imaginary voltage unit, and where the about 0 degree state, the about 90 degree state, the about 180 degree state, and the about 270 degree state cause the circular disk to radiate the signal with a cardioid pattern.

6. A power system, at least partially for a circular disk configured to radiate a signal, comprising:

a first voltage source located in a first edge opening of the circular disk; and a second voltage source located in a second edge opening of the circular disk, where the first edge opening and the second edge opening are along a common axis and where the first voltage source is at about 1 real voltage unit and about 0 imaginary voltage unit and the second voltage source is at about 1 real voltage unit and about 0 imaginary voltage unit to cause the circular disk to radiate the signal with a dipole pattern.

7. A power system, at least partially for a circular disk configured to radiate a signal, comprising:

a first voltage source located in a first edge opening of the circular disk; and a second voltage source located in a second edge opening of the circular disk, where the first edge opening and the second edge opening are along a common axis and where the first voltage source is at about 1 real voltage unit and about 1 imaginary voltage unit and the second voltage source is at about 1 real voltage unit and about 0 imaginary voltage unit to cause the circular disk to radiate the signal with a cardioid pattern.

* * * * *